W. R. TEMPLETON.
STEAM TRAP.
APPLICATION FILED MAY 11, 1912.
1,130,349.
Patented Mar. 2, 1915.
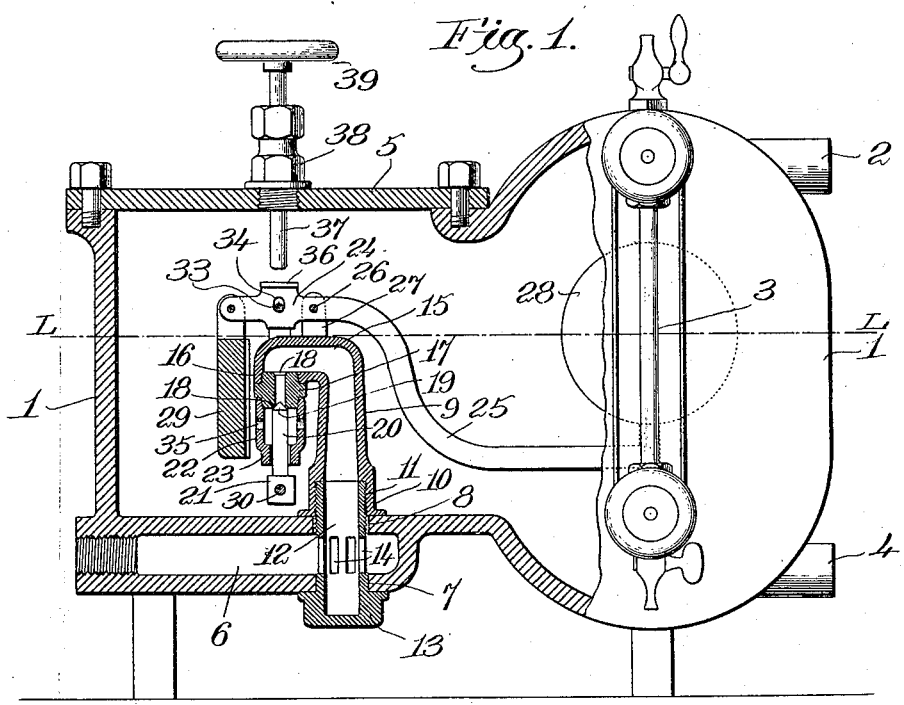
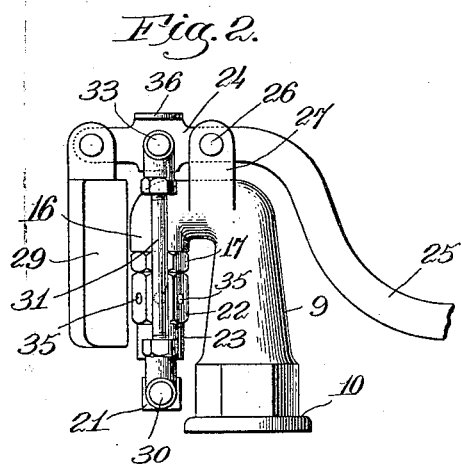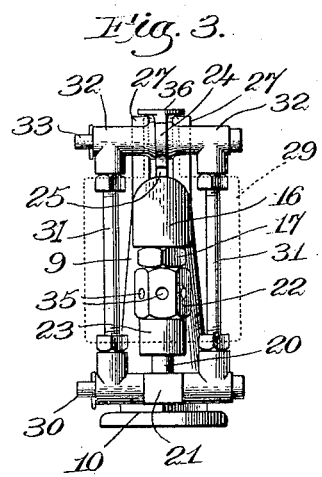
Witnesses.
Thomas J. Drummond
Warren O'Neil
Inventor.
William R. Templeton
by Edwards, Heard & Smith
Attys.

UNITED STATES PATENT OFFICE.

WILLIAM R. TEMPLETON, OF BOSTON, MASSACHUSETTS, ASSIGNOR TO TEMPLETON MANUFACTURING COMPANY, OF BOSTON, MASSACHUSETTS, A CORPORATION OF MASSACHUSETTS.

STEAM-TRAP.

1,130,349. Specification of Letters Patent. Patented Mar. 2, 1915.

Application filed May 11, 1912. Serial No. 696,556.

*To all whom it may concern:*

Be it known that I, WILLIAM R. TEMPLETON, a citizen of the United States, and resident of Boston, county of Suffolk, State of Massachusetts, have invented an Improvement in Steam-Traps, of which the following description, in connection with the accompanying drawing, is a specification, like characters on the drawing representing like parts.

This invention has for its object the production of a simple, efficient and rapidly acting steam trap for use in connection for either low or high pressures, one of the novel features of my invention residing in the construction and arrangement of the outlet or discharge valve and its seat, the valve being movable vertically up to the seat and so constructed that when it is unseated the valve will drop instantly to full open position. This part of my present invention eliminates wire drawing in the valve, obviates frictional retardation of the movement of the valve toward and from its seat, and simplifies the construction. Herein the initial movement of said discharge valve from its seat is effected by an actuator governed by the level of the water collecting in the shell or casing of the trap, the valve-seat being in direct communication with the discharge outlet of the trap, and said valve is weighted to move instantly to full open position when unseated. Such movement is permitted by virtue of a simple lost-motion connection between the valve and the actuator.

My present invention is an improvement upon and simplification of the steam trap forming the subject-matter of United States Patent No. 862,296 granted to me the sixth day of August, 1907. In said patent the trap is provided with a main discharge valve opened and closed solely by the fluid pressure within the casing, the valve-opening pressure being augmented by means of a piston controlled by a pilot-valve. Herein I have dispensed with the pressure-augmenting piston and its adjuncts intermediate the main and pilot-valves, and I have so changed the structure that a single valve effects the discharge of the trap in a direct and most efficient manner, thereby greatly simplifying construction, reducing the cost of construction, and eliminating a very considerable number of parts.

These and other novel features of my invention will be fully described in the subjoined specification and particularly pointed out in the following claims.

Figure 1 is a side elevation and vertical section of a steam trap embodying my present invention, the discharge valve being shown as seated, to close the trap; Fig. 2 is a side elevation of the valve mechanism, detached; Fig. 3 is a left hand side elevation of the mechanism shown in Fig. 2, with the counterbalancing weight for the actuator indicated by dotted lines.

Referring to Fig. 1, the main shell or casing is indicated at 1, 2 is the inlet nipple, 3 is a water or gage-glass of usual construction, 4 is a nipple for the attachment of a suitable sediment blow-off cock, not shown.

The casing has an opening at the top and at one end thereof, closed by a fluid-tight cover-plate 5, the opening being of such size that when the cover-plate is removed access may be had to the interior of the casing and the working parts of the trap are inserted or removed through such opening, all substantially as in my prior patent.

The bottom of the casing is provided with a tubular discharge outlet 6 threaded at its outer end for connection with any suitable piping to convey the water from the trap to any desired point, the lower wall of the outlet having a hole 7, Fig. 1, below a similar hole 8 in the bottom of the casing.

An upright discharge tube 9, having a laterally flanged base 10, seats upon the casing bottom above the hole 8, the base being internally threaded to engage the threaded end 11 of the tubular shank 12 of a nut 13, the shank passing through the holes 7 and 8 and closing the former, the nut when set up drawing the base 10 fluid-tight against the bottom of the casing and rigidly connecting the tube therewith.

Slots 14 are made in the shank, opening into the outlet 6, so that a free passage for the water is established from said outlet tube 9 and the discharge outlet 6. The outlet tube 9 is turned laterally at its upper end, at 15, and then downward at 16, the latter being internally threaded for engagement with a depending tubular nipple 17 having at each end thereof an annular and slightly coned valve-seat 18, Fig. 1. Said nipple is made alike at its opposite ends, so that either of the valve-seats may be used, and I thus provide for a double-ended, reversible valve-seat, so that when one seat becomes unduly worn the nipple can be reversed and the other seat used, it being understood that the seat in use is always the one at the lower end of the nipple. The discharge valve which coöperates with this valve-seat is formed by the conical or tapered upper end 19 of an upright, vertically movable stem 20 having an enlarged, heavy foot 21 of greater area than that of the valve.

As shown the valve seat is below the normal water level L—L, Fig. 1, of the trap, but is well above any accumulation of sediment, grease, or other foreign matter which may find its way into the casing. A valve chamber 22 is screwed onto the lower end of and depends from the nipple 17 and through the tubular lower end 23 of this valve chamber, the spindle 20 moves freely, and as shown in Fig. 1, there is considerable play laterally between the spindle and the part 23 so that in its vertical movement the valve is practically free from friction, the object of the part 23 being merely to confine within reasonable limits any lateral movement of the valve spindle. It does not, however, prevent the valve 19 from adapting itself to a tight fit when lifted against the valve-seat 18, the valve thus accommodating itself to the seat.

The valve is raised to its seat and it is lowered to be unseated, and when the valve is seated it will be held closed by the fluid pressure within the casing 1 acting upon the enlarged foot 21 of the valve spindle so long as such pressure is sufficient to overcome the weight of the valve and its adjuncts, it being understood that there is no pressure in the discharge passage from the valve seat.

When the valve is lowered and unseated it will be manifest that direct communication is established between the interior of the casing of the trap and the discharge outlet 6 therefor.

The discharge valve 19 is seated and unseated by means now to be described. A rocking actuator shown as a lever having a short arm 24 and a long, downwardly and laterally bent arm 25 is fulcrumed on a pin 26 carried by ears 27 on the laterally bent head or upper end 15 of the standpipe or outlet tube 9. At the end of the long arm is attached a float 28, Fig. 1, capable of withstanding high pressures, and the short arm 24 has pivotally connected with and suspended therefrom a counterbalancing weight 29, preferably a block of cast iron. When the trap is empty, that is, with the water standing therein at about the level L—L, Fig. 1, the weight 29 is partly immersed and the float 28 is upheld by the water, but slightly overbalances the member 29, to maintain the actuator in the position shown in the drawing.

A cross-bar 30 extended through the enlarged end 21 of the valve-spindle has pivotally connected with its ends upturned links 31, see Figs. 2 and 3, to the upper ends of which links are attached L-shaped heads 32, the horizontal portions of which heads sustain a transverse pin 33. This pin passes loosely through an elongated slot 34, Fig. 1, in the lever arm 24, and when the actuator is in normal position the bottom of the slot is in engagement with the pin 33, and the discharge valve 19 is seated.

The combined weight of the links, their heads 32, the cross-bar 30, and pin 33, and the valve spindle with its enlarged foot 21, is quite considerable, such weight being utilized to move the discharge valve to its full, open position instantly when it is moved downward from its seat.

It will be understood from the foregoing description and the drawings, that there is a lost motion connection between the actuator and the discharge valve to the extent of the length of the slot 34 as compared with the diameter of the pin 33 extended therethrough.

Let it be supposed that the parts are as shown in Fig. 1, and under pressure. As the water accumulates in the casing action of the accumulated water upon the float 28 will cause it to rise gradually as the counterbalancing weight 29 descends, and thereby the actuator will be rocked on its fulcrum 26. During the rocking movement of the actuator the discharge valve 19 will remain seated, owing to the action of the casing pressure upon the foot 21 and the fact that there is no pressure in the discharge passage from said valve, the slot 34 permitting the movement of the actuator while the valve remains stationary. When, however, the water in the casing rises high enough to bring the upper end of the slot against the pin 33 the slightest additional movement of the actuator will depress the pin and the links 31 to thereby move the discharge valve from its seat. Instantly that the valve is unseated thereby to substantially equalize the pressure on both ends of the valve the weight of the valve and its adjunct will cause the valve to drop a distance limited only by the length of the slot 34 to full open position, the rapidity of such opening movement being enhanced by the weight of the parts permanently connected with the valve. Thereupon the interior of the casing is in complete and direct communication with the discharge outlet 6 of the trap, and the latter will thereby be discharged. The float will rise slightly at the instant that the valve is unseated, owing to the fact that the resistance to such lifting movement of the trap presented by the valve prior to its unseating, is removed, and this slight additional rocking of the actuator prevents any tendency of the discharge valve 19 to be re-seated by the inrush of the fluid under pressure at the instant the valve is unseated, and thereby giving the weight of the valve and its adjunct time to effect the full opening movement of said valve. Once the valve reaches its full open position it remains in such position until positively closed.

As the trap discharges the water level in the casing falls, and the actuator will rock slowly in the opposite direction to its valve-opening movement as the float 28 descends, and finally just before low water level is reached the bottom of the slot 34 will engage and lift the pin 33, and through the intermediate connections the discharge valve 19 will be lifted to its seat. Once seated the equilibrium of pressure on the valve and its stem is destroyed, and the casing pressure will retain the valve shut until it is time for the trap to again discharge.

The valve 19 is opened and closed quickly and sharply, so that there is in practice no wire drawing, through the valve seat 18 which as hereinbefore explained occurs when opening or closing a slow moving valve, and wear on its valve seat is thereby reduced to a minimum.

It will be understood that in the present trap, as is also the case in the trap shown in my prior patent, the discharge outlet is fully open for the complete discharge and the discharge is not effected until the predetermined water level is attained, nor is the discharge outlet of the trap closed until the discharge is completed.

The capacity of the trap depends, of course, upon the diameter of the valve seat, the larger such diameter the greater quantity of water which can pass through the valve seat in a given length of time. Since the seat for the discharge valve 19 is always below the normal water line of the trap there is no possibility for leakage or waste of steam therethrough.

The valve chamber 22 has a series of inlet openings 35 to facilitate the entrance of the water thereto, and to provide for ample flow when the valve 19 is opened and the trap is discharging.

The valve-chamber serves to protect the valve as well as to form a loose lateral bearing for the spindle 20. The arm 24 of the actuator has an enlarged portion 36 adapted to be engaged by the lower end of a spindle 37 carried in a suitable stuffing box or gland 38 on the cover plate and operated by hand wheel 39, Fig. 1. If the spindle is screwed down it will engage the enlargement 36 and thereby the actuator will be rocked to unseat the discharge valve 19 and the trap can be blown out at such time without removing the cover plate. Of course the spindle 37 is maintained elevated under normal conditions, to be wholly out of engagement with the actuator. It will be readily understood that by taking off the cover plate 5 and unscrewing the nut 13 to thereby disengage its shank from the base of the outlet tube or stand-pipe 9, the latter and all of the internal mechanism of the trap can be instantly removed from the casing. It will also be readily understood from the foregoing that this removal of the internal mechanism of the trap in no case necessitates any breaking or disconnecting of the connections between the trap and the piping system which it serves.

While the lost motion connection between the actuator and discharge valve is a positive and short one, it is not, in any sense rigid, hence it does not interfere with the freedom which the discharge valve has to accommodate itself to its seat.

Having fully described my invention, what I claim as new and desire to secure by Letters Patent is:

1. The combination, with a casing of a steam trap having at its bottom a discharge outlet, of an upright discharge tube fixedly held in the casing and at its lower end communicating directly with said outlet, said tube being downturned at its upper end, a valve-seat in said downturned end, a weighted discharge valve movable vertically toward and away from the valve-seat, a float-controlled, rocking actuator mounted on the discharge tube, and a lost-motion connection between said actuator and valve, the actuator operating through said connection to move downward and unseat the valve when the water in the casing reaches a predetermined level, the weight of the valve thereupon causing it to drop immediately to full open position, the actuator lifting the valve against the valve-seat and closing communication between the discharge tube and the interior of the casing immediately upon discharge of the trap.

2. The combination, with a casing of a steam trap having at its bottom a discharge outlet, of an upright discharge tube fixedly held in the casing and at its lower end communicating directly with said outlet, said tube being downturned at its upper end, a double-ended, reversible valve-seat removably mounted in said downturned end, a discharge valve movable vertically toward and from the valve-seat and having a depending, weighted spindle, a loosely coöperating guide for said spindle, permitting the valve to seat itself firmly upon the seat when lifted against it, a float-controlled rocking actuator mounted on the discharge tube, and a lost-motion connection between said actuator and valve, the actuator operating through said connection to move downward and unseat the valve when the water in the casing reaches a predetermined level, the weight of the valve thereupon causing it to drop immediately to full open position, the actuator lifting the valve against the valve-seat and closing communication between the discharge tube and the interior of the casing immediately upon discharge of the trap.

3. The combination, with a casing of a steam trap having at its bottom a discharge outlet, of an upright discharge tube fixedly held in the casing and at its lower end communicating directly with said outlet, said tube being downturned at its upper end, a valve-seat in said downturned end, a discharge valve movable vertically toward and from the valve-seat and having a depending, weighted spindle, a loosely fitting lateral guide for the spindle at a distance below the valve, permitting the valve to accommodate itself to the seat when lifted against it, a float-controlled, rocking actuator mounted on the discharge tube, and a lost-motion connection between said actuator and valve, the actuator operating through said connection to move downward and unseat the valve when the water in the casing reaches a predetermined level, the weight of the valve thereupon causing it to drop immediately to full open position, the actuator lifting the valve against the valve-seat and closing communication between the discharge tube and the interior of the casing immediately upon discharge of the trap.

4. The combination with a casing of a steam trap having at its bottom a discharge outlet, of an upright discharge tube fixedly held in the casing and at its lower end communicating directly with said outlet, said tube being downturned at its upper end, a double ended, reversible valve seat removably mounted in said downturned end, a valve chamber provided with a series of inlet openings removably mounted on the lower end of said reversible valve seat, a discharge valve movable vertically toward and from the valve seat and having a depending weighted spindle extending through said valve chamber, said valve chamber acting as a loosely fitting lateral guide for the spindle at a distance below the valve, permitting the valve to accommodate itself to the seat when lifted against it, a float controlled, rocking actuator, mounted on the discharge tube, and a lost motion connection between said actuator and valve, the actuator operating through said connection to move downward and unseat the valve when the water in the casing reaches a predetermined level, the weight of the valve thereupon causing it to drop immediately to full open position, the actuator lifting the valve against the valve seat and closing connection between the discharge tube and the interior of the casing immediately upon discharge of the trap.

In testimony whereof, I have signed my name to this specification, in the presence of two subscribing witnesses.

WILLIAM R. TEMPLETON.

Witnesses:
   JOHN C. EDWARDS,
   FREDERICK S. GREENLEAF.

Copies of this patent may be obtained for five cents each, by addressing the "Commissioner of Patents, Washington, D. C."